United States Patent [19]

Feldman et al.

[11] Patent Number: 4,692,136
[45] Date of Patent: Sep. 8, 1987

[54] CENTRIFUGE

[75] Inventors: Louis W. Feldman; David H. Yawn, both of Houston, Tex.

[73] Assignee: Cardiovascular Systems Inc., The Woodlands, Tex.

[21] Appl. No.: 833,940

[22] Filed: Feb. 25, 1986

Related U.S. Application Data

[63] Continuation-in-part of Ser. No. 786,780, Oct. 11, 1985.

[51] Int. Cl.[4] .............................................. B04B 7/08
[52] U.S. Cl. .................................... 494/38; 277/81 R; 277/92; 494/84
[58] Field of Search .................... 494/38, 39, 41, 43, 494/85, 84; 210/360.1, 781, 782; 277/93 R, 935 D, 92, 81 R

[56] References Cited

U.S. PATENT DOCUMENTS

| | | | |
|---|---|---|---|
| 1,684,870 | 9/1928 | Lewis | 494/38 |
| 2,662,687 | 12/1953 | Spross | 494/41 |
| 3,054,620 | 9/1962 | Schwing | 277/95 |
| 3,145,713 | 8/1964 | Latham, Jr. | 128/214 |
| 3,244,363 | 4/1966 | Hein | 233/28 |
| 3,317,127 | 5/1967 | Cole | 233/26 |
| 3,409,213 | 11/1968 | Latham, Jr. | 233/21 |
| 3,565,330 | 2/1971 | Latham, Jr. | 233/21 |
| 3,581,981 | 6/1971 | Latham, Jr. | 233/21 |
| 3,634,228 | 1/1972 | Latham, Jr. | 210/21 |
| 3,782,735 | 1/1974 | Novosad | 277/92 |
| 3,785,549 | 1/1974 | Latham, Jr. | 233/23 |
| 3,858,796 | 1/1975 | Unger et al. | 233/27 |
| 3,987,961 | 10/1976 | Sinn et al. | 233/27 |
| 4,086,924 | 5/1978 | Latham, Jr. | 128/214 |
| 4,109,855 | 12/1978 | Brown et al. | 233/25 |
| 4,142,670 | 3/1979 | Ishimaru et al. | 233/20 |
| 4,151,844 | 5/1979 | Cullis et al. | 128/214 |
| 4,256,313 | 3/1981 | Arnold | 277/92 |
| 4,300,717 | 11/1981 | Latham, Jr. | 233/1 A |
| 4,413,771 | 11/1983 | Rohde et al. | 494/17 |
| 4,413,772 | 11/1983 | Rohde et al. | 494/17 |
| 4,413,773 | 11/1983 | Rohde et al. | 494/37 |
| 4,622,029 | 11/1986 | Nilsson | 494/2 |

FOREIGN PATENT DOCUMENTS

| | | |
|---|---|---|
| 2302140 | 9/1976 | France .................. 494/41 |
| WO84/01794 | 11/1984 | PCT Int'l. Appl. . |
| WO84/01796 | 11/1984 | PCT Int'l. Appl. . |
| 1541344 | 10/1977 | United Kingdom . |
| 2002266 | 8/1978 | United Kingdom . |
| 2003757 | 9/1978 | United Kingdom . |
| 2005163 | 10/1978 | United Kingdom . |
| 2013110 | 1/1979 | United Kingdom . |
| 2084051 | 9/1980 | United Kingdom . |
| 2098098 | 4/1982 | United Kingdom . |
| 2128904 | 10/1982 | United Kingdom . |
| 2168267 | 12/1985 | United Kingdom . |

OTHER PUBLICATIONS

Mollison "Blood Transfusion in Clinical Medicine", pp. 15-18 (1983).
"Packed Cells in 3 Minutes", brochure of Haemonetics Corp., dated prior to Mar. 10, 1985.
"Cell Saver 4 Autologous Blood Recovery System", brochure of Haemonetics Corp. dated prior to Mar. 10, 1985.
"Haemonetics", Instructions for Haemonetics Corp. unit, dated prior to Mar. 10, 1985.

Primary Examiner—Robert W. Jenkins
Attorney, Agent, or Firm—Vaden, Eickenroht, Thompson & Boulware

[57] ABSTRACT

A centrifuge is provided which has a stationary core and a bowl rotatively mounted about the core. The bowl can be configured so that it does not taper inwardly from top to bottom. The bowl has an upwardly extending neck which receives the stationary core. To provide a seal between the core and bowl, a lip seal can be employed which is emplaced about an upwardly extending neck of the bowl and abuts an outwardly and downwardly extending nut formed integrally of the core or a face seal can be employed between a shoulder of the nut and a shoulder of the neck.

9 Claims, 9 Drawing Figures

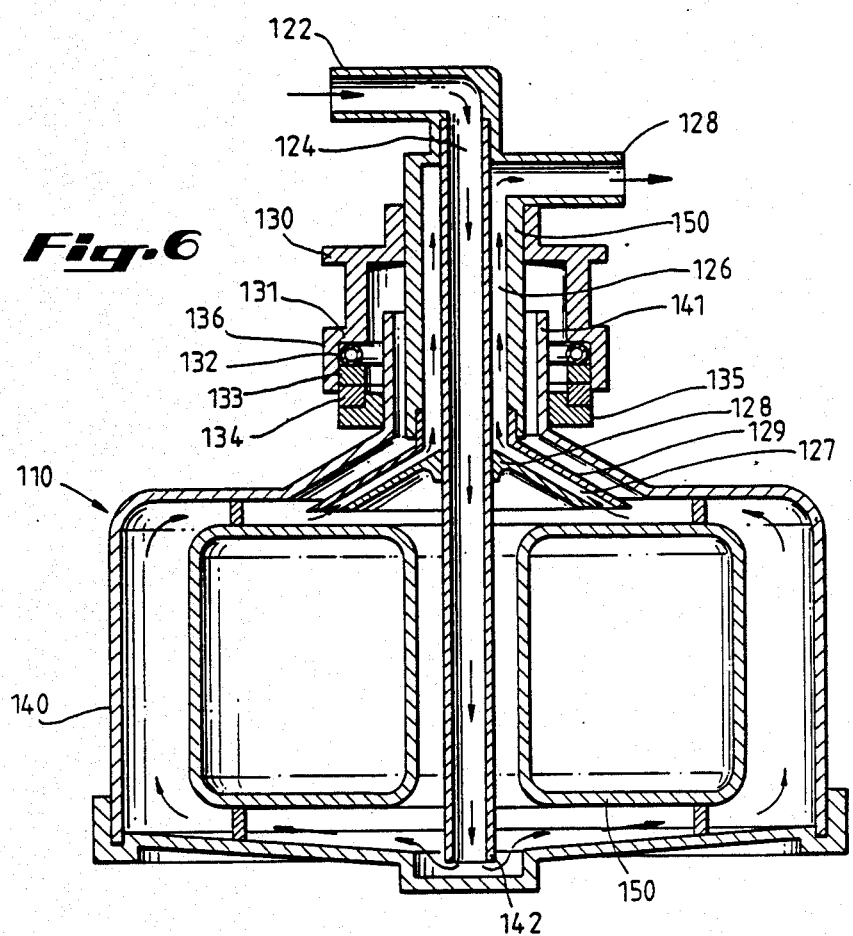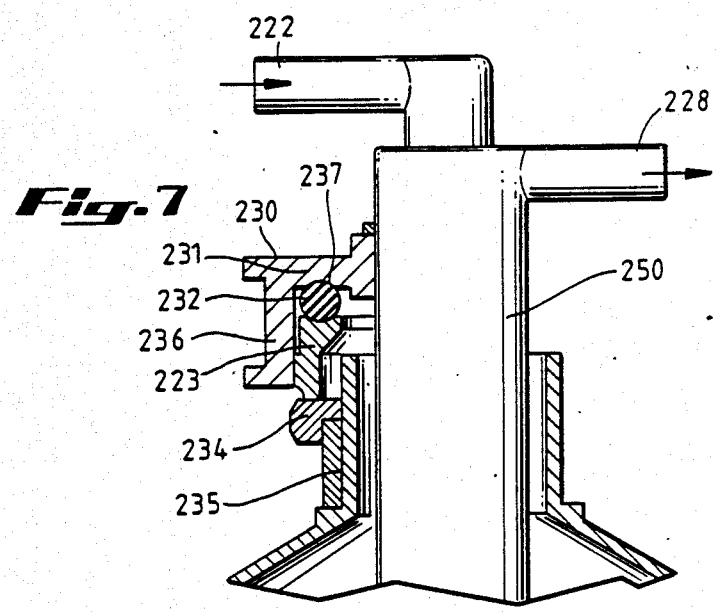

CENTRIFUGE

CROSS-REFERENCES TO RELATED APPLICATIONS

This is a continuation-in-part of application U.S. Ser. No. 786,780, filed Oct. 11, 1985.

BACKGROUND OF THE INVENTION

1. Field of Invention

This invention is directed to the field of centrifuges, to seals therefor, and to bowls for centrifuges. Certain embodiments are particularly suited to applications in the field of blood-processing.

2. Description of the Prior Art

In maintaining or handling blood it is often necessary to perform certain processes, including centrifuging. Among the prior art devices made to meet the stringent requirements of handling blood are the centrifuges of U.S. Pat. Nos. 3,145,713 and 3,317,127. The centrifuges described in these patents have applications to pumps, centrifuges, and mixing devices in general. In such centrifuges, and mixing devices in general. In such centrifuges for sterile processing it is necessary to effectively seal the area between the rotating and stationary members of the device.

In centrifuges for handling fluids subject to contamination, the centrifuge bowl should rotate, but the flow lines for the fluid inlet and outlet should remain stationary. This requires a rotating seal which is effective when frictional heating is so low and the dissipation of heat is so high that the blood, or other heat sensitive fluid, is not exposed to high temperatures. The seal should not produce abraded particulate contaminants which might flow into the blood or other liquid and it is desirable that the seals be easy to install and easy to sterilize. Also the seal should achieve high reliability in service and be capable of tolerating misalignment and vibration.

U.S. Pat. Nos. 3,409,213 and 3,565,330 present examples of rotary centrifuge seals. These patents teach rotary seals which are formed from a stationary rigid low friction member in contact with a moving rigid member to create a dynamic seal, and an elastomeric member which provides a resilient static seal as well as a closing force between the surfaces of the dynamic seal. Another rotary seal, described in U.S. Pat. No. 3,801,142, has a pair of seal elements having confronting annular fluid-tight sealing surfaces which are maintained in a rotatable, but fluid-tight, relationship.

Another rotary seal used in a blood-processing centrifuge known as the "B. T. Bowl", marketed by Bellco, Mirandolar, Italy, has a ceramic ring attached to rotatable elements of the centrifuge and a fixed graphite ring attached to stationary centrifuge elements, the ring members being in sealing relationship with each other. An elastomeric diaphragm is connected at one end to an adapter ring for the graphite ring and at the other end to a stationary part of the centrifuge. This type of rotary seal lacks adequate provision for assuring that wear particles will be ingested and expelled to the outside without entry into the fluid pathway.

Because of the outwardly tapering wall shape of the rotating bowl in various prior art centrifuging devices, forces are created which impel the bowl upward. If the apparatus holding the bowl in place fails, comes loose, or is improperly connected, these upward forces can cause the bowl to disengage resulting in damage to the device and possible injury to persons nearby. Also, because of the relatively sharp slope of the bowl walls, the forces which act on the liquid are not uniform or nearly uniform.

SUMMARY OF THE INVENTION

The present invention is directed to an improved centrifuge, seal therefor, securement therefor, and a centrifuge bowl which avoid or eliminate the problems of the prior art devices and which reduce the unwanted upward forces created by prior art bowls. According to the present invention a centrifuge bowl has a stationary core about which is rotatably mounted an outer rotating bowl. An inner hollow shell is secured within the outer rotating bowl. In one embodiment the outer bowl is designed so the the forces developed therein have a downward component which helps hold the bowl down while it is spinning. Because of the relatively flattened configuration of the bowl and the non-outwardly-tapering walls, blood cell retention and washing is facilitated. Also this configuration permits sufficient forces to be developed at standard speeds so that conventional motors can be used without the necessity of either mechanically or electronically boosting the motor to higher speeds.

The stationary core has a nut formed integrally thereof for receiving and holding the neck of the outer rotating bowl. A first lip seal can be provided between the bowl neck and the nut by a tube placed about the neck cooperating with an expansible seal ring which abuts the interior surface of the nut and presses against the exterior surface of the tube. On the neck above the first tube, a second tube seal can be placed over the neck which extends partially beyond the neck. When the rotating bowl is stationary, the lip of the second tube seal contacts the stationary nut forming a seal which prevents blood and other matter from flowing to the first seal. However, as the bowl spins, the second tube seal is deformed, permitting outwardly forced particles such as particulate contaminants to flow into a trap zone between the second tube seal and the first seal. When the second tube seal has deformed so that it no longer contacts the nut, no abrasion of the seal due to contact with the nut is possible, thereby reducing the amount of abraded particles in the liquid. A baffle is provided within the outer rotating bowl to baffle the flow of liquid existing the outer bowl. A pin and groove securement means can be provided to assist in holding the bowl in place during operation.

In another embodiment a dual ring face seal is provided between a horizontally extending shoulder of the nut and a horizontally extending shoulder of the neck. An elastomeric member may be employed between the nut and the seal to effect a sealing force between the dual rings.

It is therefore an object of the present invention to provide an improved centrifuge, an improved seal therefor, and an improved centrifuge bowl.

Further objects of the present invention are the provision of a centrifuge bowl such that: desired separation of liquid components is achieved at speeds and at centrifugal forces lower than the speeds of prior art devices; improved hematocrits are realized; the level of hemolysis is minimal; the danger of contaminating the centrifuged liquid is reduced; and the need for face seals is eliminated.

Another object of the present invention is the provision of a centrifuge bowl so configured that the upward component of force is reduced and, when used with blood, cell retention and washing is facilitated.

Yet another object of the present invention is the provision of a centrifuge bowl having a deformable lip seal barrier which responds to outwardly directed force during spinning of the centrifuge, deforming in response to such force to permit particulates to be trapped and prevented from flowing into and contaminating the centrifuged liquid. Such a seal does not abrade when it has ceased to contact the sealing surface during rotation.

An additional object of the present invention is the provision of such a centrifuge bowl having an expansible lip seal member for sealing off the trap zone.

A particular object of the present invention is the provision of securements to assist in holding the bowl in place on a rotating mechanism, the securements including recesses on the bowl for receiving and holding pins projecting from the rotating mechanism.

Yet another object of the present invention is the provision of a dual ring seal between a shoulder on a nut about the centrifuge neck and a shoulder on the neck itself. A specific object is the provision of a resilient member between the nut and the seal to enhance the seal's effectiveness.

To one of skill in this art who has the benefit of this invention's teachings, other objects and advantages will be clear from the following description of the presently preferred embodiments of the invention, given for the purpose of disclosure, when taken in conjunction with the accompanying drawing. Also it should be understood that, although the preferred embodiments stress the application of the present invention to blood centrifuges, the present invention is directed to centrifuges for the centrifugable liquids.

BRIEF DESCRIPTION OF THE DRAWINGS

FIG. 4c is a side view in cross section of the recess of FIG. 4a.

FIG. 6 illustrates in cross section another embodiment of a centrifuge bowl according to the present invention drawn to scale.

FIG. 7 illustrates in cross section another embodiment of a seal according to the present invention.

DESCRIPTION OF THE PREFERRED EMBODIMENTS

Figure 1:
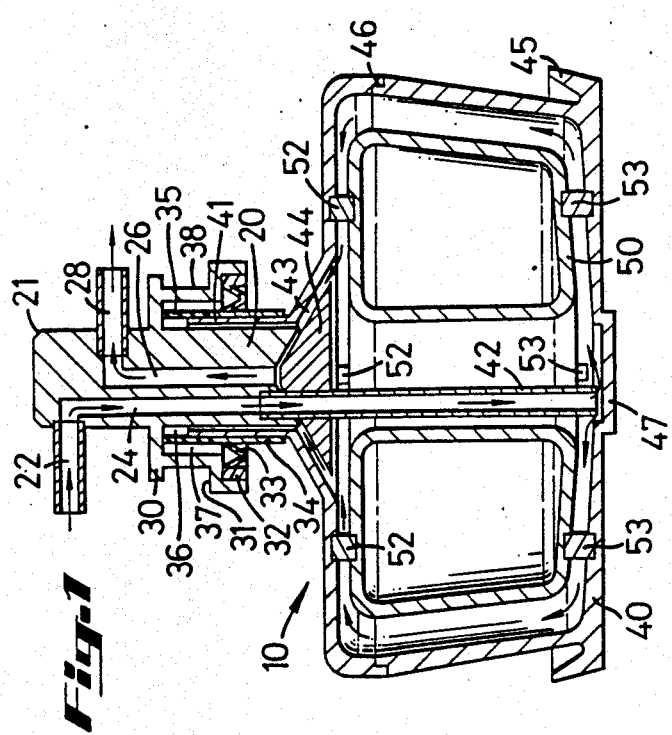
FIG. 1 is a side cross-sectional view, drawn to scale, of a centrifuge according to the present invention.

The Embodiment of FIG. 1

As illustrated in FIG. 1, the centrifuge 10 has the stationary core 20 about which the outer rotating bowl 40 is rotatably mounted. The core 20 has the inlet 22 for receiving the liquid to be centrifuged. The inlet 22 communicates with the inlet channel 24 which in turn communicates with the bowl tube 42 through which the liquid flows into the interior of the outer rotating bowl 40. Centrifuged supernatant liquid, such as blood serum and wash, flow upwardly from the interior of the outer rotating bowl 40 ito the outlet channel 26 to the outlet 28 from which the liquid exits the device.

Elements, such as blood cells and platelets (which are known as "formed elements"), are collected in the space between the interior surface of the bowl 40 and the exterior surface of the shell 50 at the sides of the bowl 40. The locating taper 21 on the core 20 facilitates emplacement of the bowl on a motorized table apparatus (not shown).

The core 20 has the stationary nut 30 which is configured to receive, hold and seal the outer rotating bowl 40. The shoulder 31 of the nut 30 has secured thereto the seal 32. The seal 32 has the accordion member 33 for dynamically sealing against the tube 34. In the preferred embodiment the seal 32 is made of an elastomer such as polyurethane or a polymer such as TEFLON (Registered Trademark); the tube 34 is made of metal such as stainless steel or aluminum; and LEXAN is used for the bowl 40, the shell 50, the core 20, and the baffle 44.

The tube 34 is emplaced about the neck 41 of the outer rotating bowl 40. The tube 34 does not extend along the entire length of the neck 41. Another tube, the tube 35, is disposed about the neck 41 and extends beyond it so that its top edge or lip abuts the lower side of the top part of the stationary nut 30. The tube 35 is made of a material which will deform outwardly from neck 41 in response to rotational forces, so that in operation its top edge or lip moves outwardly with respect to the core 20 thereby permitting flow from the trap channel 36 to the trap zone 37. Unwanted particulate contaminants and abraded particles flow toward the seal 32 due to the upward and outward components of rotational forces. As the speed of the centrifuge is reduced and then stops, the seal tube 35 again contacts the nut 30, thereby closing off the trap zone 37 and preventing the back flow of particulate contaminants.

The outer rotating bowl 40 has the stationary baffle 44 mounted to the bowl tube 42 to baffle the flow of liquid into the top channel 43. The lip 45 is formed integrally of the bowl 40 and provides means for securing the bowl in place; an appropriate holding means (not shown in FIG. 1) can grip the lip 45 to hold the bowl 40. The protrusion 47 mounts on a conventional centrifuge table which is connected to a motor (not shown in FIG. 1). The rotative force of the motor is imparted to the table and to the bowl 40 mounted on the table. The inner shell 50 is secured to the bowl 40 by top mount 52 and by bottom mount 53. It is preferred that the inner shell 50 be hollow. It serves to create an area for the accumulation of formed elements. The mounts 52 and 53 are perforated so that centrifuged fluid may flow to top channel 43 and into outlet channel 26.

Figure 2:
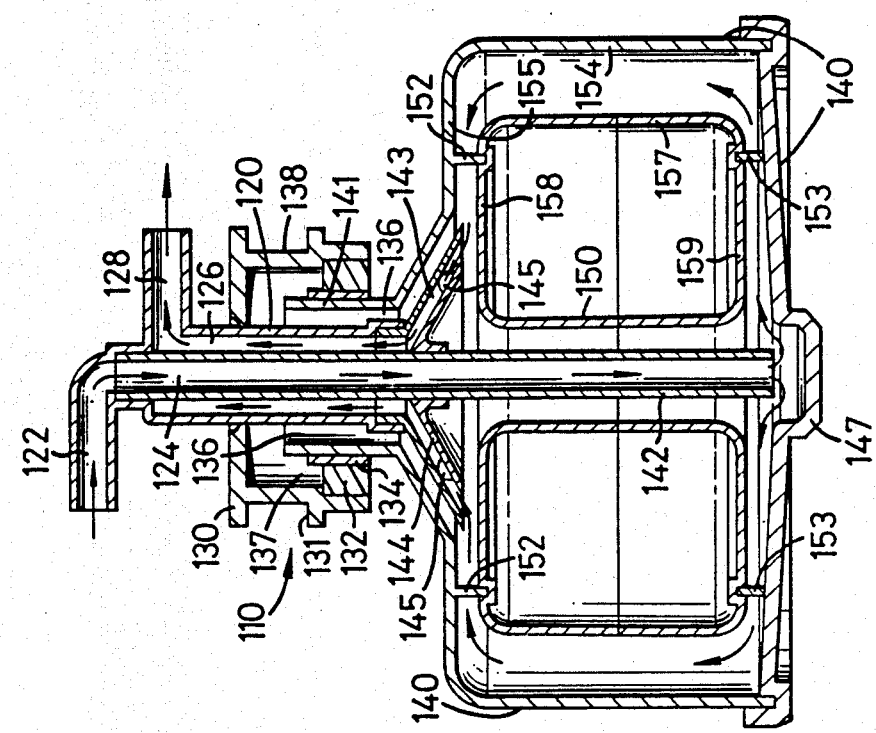
FIG. 2 is a side cross-sectional view, drawn to scale, of another centrifuge according to the present invention.

Because of the configuration of the outer rotating bowl 40 and the inner shell 50 in which the sides taper inwardly from top to bottom, the upwardly-directed component of the forces generated by spinning which tend to impel the bowl 40 upwardly are reduced. Also, by flattening the bowl 40 and by increasing its diameter greater centrifugation (separation) forces are generated at lower speeds. A centrifuge bowl made according to the present invention as shown in FIG. 2 consistently produces hematocrits of about 55% to 60% at 3450 r.p.m. and results in a greater amount of platelet retention, whereas commercially available prior art devices produce hematocrits of only about 50% to 55% at this speed. Also minimal levels of hemolysis are achieved with a device according to the present invention.

The Embodiment of FIG. 2

As illustrated in FIG. 2, the centrifuge 110 has the stationary core 120 about which the outer rotating bowl 140 is rotatably mounted. The core 120 has the inlet 122 for receiving the liquid to be centrifuged. The inlet 122 communicates with the bowl tube 142 through which the liquid flows into the interior of the outer rotating bowl 140. Centrifuged supernatant liquid, such as blood serum and wash, flow upwardly form the interior of the outer rotating bowl 140 into the outlet channel 126 to the outlet 128 from which the liquid exits the device.

Elements, such as blood cells and platelets (which are known as "formed elements"), are collected in the space between the interior surface of the bowl 140 and the exterior surface of the inner shell 150 at the sides of the bowl 140.

The core 120 has the stationary nut 130 which is configured to receive, hold and seal the outer rotating bowl 140. The shoulder 131 of the nut 130 has secured thereto the seal 132. The seal 132 sealingly contacts the tube 134 creating a dynamic seal. In the preferred embodiment the seal 132 is made of polyurethane or TEFLON (Registered Trademark); the tube 134 is made of metal, such as stainless steel or aluminum; and LEXAN is used for the bowl 140, the shell 150, the core 120, and the baffle 144.

The tube 134 is emplaced about the neck 141 of the outer rotating bowl 140. The tube 134 does not extend along the entire length of the neck 141. Another tube, such as the tube 35 of FIG. 1, can be used about the neck 141 to operate as it does in the embodiment of FIG. 1.

The outer rotating bowl 140 has the stationary baffle 144 mounted to the bowl tube 142 to baffle the flow of liquid into the top channel 143. The beads 145 serve to facilitate the mounting of the baffle 144 and provide contact points between the baffle 144 and the core 120. The beads 145 are spaced intermittently so that flow through the top channel 143 is possible. The protrusion 147 mounts on a conventional centrifuge table which is connected to a motor (not shown in FIG. 2). The rotative force of the motor is imparted to the table and to the bowl 140 mounted on the table. The inner shell 150 is secured to the bowl 140 by top mount 152 and by bottom mount 153. The mounts 152 and 153 are perforated so that centrifuged fluid may flow to top channel 143 and into outlet channel 126. It is preferred that the inner shell 150 be hollow. The inner shell 150 serves to create an area in the bowl 140 for the accumulation of formed elements.

Because of the configuration of the outer rotating bowl 140 in which the side wall 154 is perpendicular to the top wall 155, and that of the shell 150 in which its side wall 157 is perpendicular to its top wall 158 and to its bottom wall 159, the upwardly-directed component of the forces generated by spinning which would tend to impel the bowl upwardly are reduced. Also, by flattening the bowl 140 as compared to prior art bowls and by increasing its diameter greater configuration (separation) forces are generated at lower speeds.

A centrifuge bowl made according to the present invention consistently produces hematocrits of about 55% to 60% at 3450 r.p.m. and results in a greater amount of platelet retention, whereas commercially available prior art devices produce hematocrits of 50% to 55% at this speed. Also minimal levels of hemolysis are achieved with a device according to the present invention.

Figure 3:
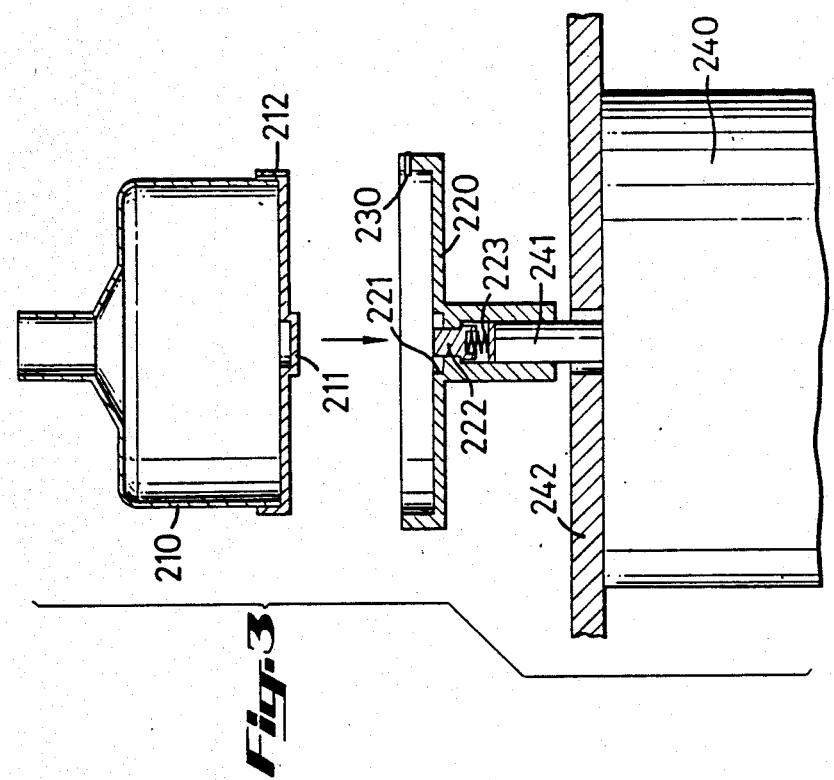
FIG. 3 is a cross-sectional view, drawn to scale, showing a bowl according to the present invention for emplacement on a centrifuge table which is secured to a motor.

As shown in FIG. 3 the bowl 210 is emplaceable on and secureable to the table 220 by means of a pin 230. The protrusion 211 of the bowl 210 is received in the recess 221 of the table 220. The plunger 222 contacts the protrusion 211 and, due to the upward force of the spring 223, pushes up against the protrusion 211 thereby forcing the bowl 210 upwardly. The table 220 is secured to the motor shaft 241 of the conventional motor 240. The motor 240 is conventionally mounted to the motor mount member 242.

In the preferred embodiment there are three pins 230 in the table 220, but it should be understood that any suitable number, one or more, may be used. The bowl 210 has a recess (see FIGS. 3, 4a, 4b, 4c) such as the recess 212 for receiving and holding the pin 230. The recess 212 has the inlet groove 213 and the valve groove 214. Because of the upward force of the spring 223, the bowl 210 must be pushed down so that the pin 230 enters the inlet groove 213. When the bowl 210 has been moved sufficiently downward, turning either the bowl 210 or the table 220 in the correct direction will move the pin 230 to a point above the valley groove 214. When downward pressure on the bowl is released the pin 230 will be held in the valley groove 214. To facilitate emplacement of a bowl, more recesses than pins can be provided.

Figure 5:
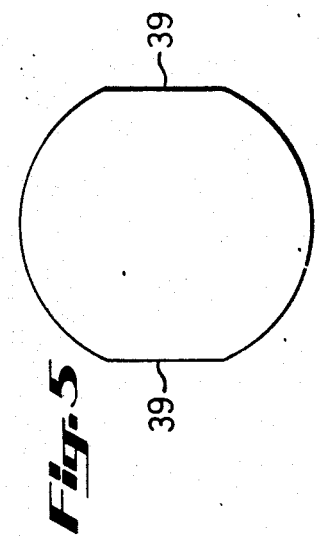
FIG. 5 illustrates in cross section one embodiment of the exterior surface only of the stationary nut of the core.
Figure 4A:
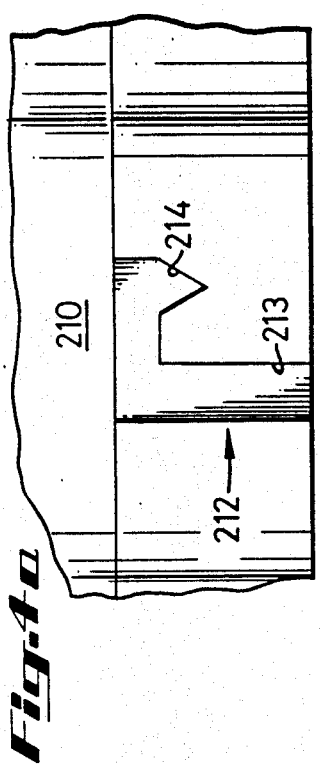
FIG. 4a is a side view in cross section of a recess in the side of a bowl for receiving and holding a pin projecting from the rotation mechanism.
Figure 4B:
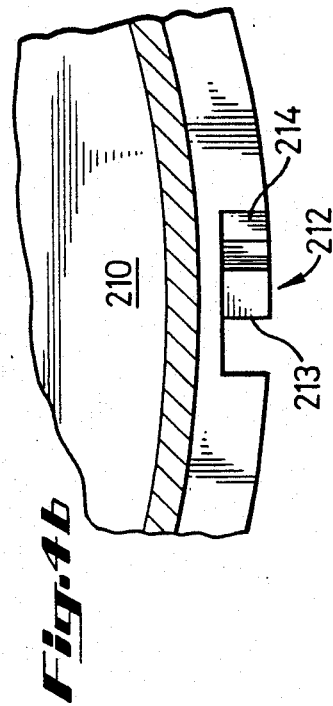
FIG. 4b is a top view of the recess of 4a in cross section.
Figure 4C:
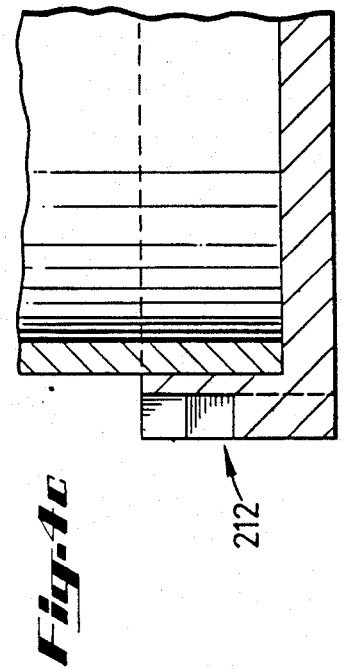

FIG. 5 illustrates the preferred embodiment for the clamping surface 38 of the bowl 10 or the clamping surface 138 of the bowl 110. The surface is provided with flat portions 39 which facilitate emplacement of clamping, holding or stabilizing devices about the top of the bowl. Since the diameter of the nuts 30 or 130 is larger than the diameter of their respective stationary cores 20 and 120, more gripping surface is provided for a clamping device to grip as compared to prior art devices in which clamping is accomplished about the core itself or some lesser diameter portion of the core. Also, the nuts 30 and 130 are located relatively low on their cores as compared to the point of clamping on various prior art devices, thereby providing a more stable clamp.

As compared to various prior art devices bowls according to this invention are flatter, wider, and their side walls do not taper outwardly. This permits larger areas of more uniform forces to be created within the bowl which facilitates cell retention and washing. Also the configuration and shape of such bowls permits higher forces to be built up at lower speeds so that motors used to rotate the bowls, such as conventionally available 3450 r.p.m. motors, do not need to be boosted to higher speeds to achieve greater forces and better results.

FIG. 6 illustrates another embodiment of a centrifuge according to the present invention. The centrifuge 110 has the outer bowl 140, the inner rotating shell 150 mounted within the bowl 140, and the bowl tube 142 protruding into the bowl 140. Material flows through inlet 122, through the inlet channel 124, into the bowl 140 and then passes into the outlet channel 126 via the baffle channel 127 formed between the bowl baffle member 128 and the top baffle member 129, and thence from the centrifuge via the outlet 128.

A seal is effected between the bowl 140 and the top member 150 by the sealing contact of the top ring 133 and the bottom ring 134. The top ring 133 is connected or affixed to the downwardly projecting portion 136 of the stationary nut 130. The nut 130 is connected to, affixed to, or formed integrally of the top member 150. The bottom ring 134 is connected or affixed to the bowl shoulder 135.

To aid in the sealing contact of the rings 133 and 134 a resilient member such as the tube ring 132 can be emplaced between the nut shoulder 131 and the top ring 133 to urge the top ring 133 toward the bottom ring 134. Although not shown it is within the scope of this invention to provide the urging resilient member at different locations. For example, the bottom seal 134 could be affixed to the shoulder 135 with a space left between the ring 134 and the neck 141 and with a resilient member disposed in the space to urge the bottom ring 134 sideways toward the top ring 133.

The tube ring 132 can be fashioned from any appropriate resilient material such as latex, silicone, or rubber. The preferred material is silicone. The rings 133 and 134 can be fashioned from any hard sealing material such as ceramic materials or graphite. Ceramic materials are preferred.

FIG. 7 illustrates another sealing arrangement for a centrifuge according to the present invention which is similar to the seal means shown in FIG. 6. In the embodiment of FIG. 7 a solid O ring made from resilient material is connected to or affixed to the recess 237 in the upper nut shoulder 231 of the stationary nut 230 of the top member 250.

The upper seal member 232 is connected to or affixed to the downwardly extending portion 236 of the stationary nut 230. The lower seal member is connected to or affixed to the bowl portion 235 and is disposed in sealing contact with the upper seal member 233. The O ring 232 urges the upper seal member 233 into sealing contact with the lower seal member 234.

In conclusion, therefore, it is seen that the present invention and the embodiments disclosed herein are well adapted to carry out the objects and obtain the ends set forth as well as others inherent therein. One of skill in this art who has the benefit of this invention's teachings will realize that certain changes can be made without departing from the spirit and scope of the invention as claimed below.

What is claimed is:

1. A centrifuge for processing liquids having a first and second assembly of components one of which is capable of rotating relative to the other, the centrifuge comprising
said first assembly of components comprising core means for receiving and expelling the liquid and for transmitting the liquid to said second assembly, said core means having outwardly extending core shoulder means,
said second assembly of components comprising bowl means rotatively mounted about said core means for receiving the liquid and holding it, said bowl means not tapering outwardly from top to bottom,
hollow interior shell means mounted within said bowl means forming an area in the interior periphery of the bowl means in which elements in the liquid can accumulate,
said bowl means having upwardly extending neck means for receiving said core means, the neck means rotating about said core means during operation of the centrifuge, the neck means having outwardly extending neck shoulder means and wherein seal means are provided between said core means and said neck means for preventing the egress of liquid from between said core means, and
said seal means comprising first ring means connected to said core shoulder means and second ring means connected to said neck shoulder means so that said first ring means and said second ring means sealingly contact each other.

2. The centrifuge of claim 1 wherein the first ring means is ceramic.

3. The centrifuge of claim 1 wherein the second ring means is ceramic.

4. The centrifuge of claim 1 wherein a resilient member is placed between at least one of the ring means and its respective shoulder means to force the ring means into contact with the other ring means.

5. The centrifuge of claim 4 wherein the resilient member is placed between the first ring means and the core shoulder means.

6. The centrifuge of claim 4 wherein the resilient member is placed between the second ring means and the neck shoulder means.

7. The centrifuge of claim 4 wherein the resilient member is hollow.

8. The centrifuge of claim 4 wherein the resilient member is tubular.

9. A centrifuge for processing liquids having a first and second assembly of components one of which is capable of rotating relative to the other, the centrifuge comprising
said first assembly of components comprising core means for receiving and expelling the liquid and for transmitting the liquid to said second assembly, said core means having outwardly extending core shoulder means,
said second assembly of components comprising bowl means rotatively mounted about said core means for receiving the liquid and holding it, said bowl means not tapering outwardly from top to bottom,
hollow interior shell means mounted within said bowl means forming an area in the interior periphery of the bowl means in which elements in the liquid can accumulate,
said bowl means having upwardly extending neck means for receiving said core means, the neck means rotating about said core means during operation of the centrifuge, the neck means having outwardly extending neck shoulder means, and wherein seal means are provided between said core means and said neck means for preventing the egress of liquid from between said core means and said neck means to the exterior of the centrifuge,
said seal means comprising expansible seal means connected to said core means and expanding to sealingly contact said neck means.

* * * * *